Oct. 27, 1970  L. E. SMITH  3,535,874

STARTING SYSTEM WITH SELECTOR VALVE

Filed Dec. 5, 1968  2 Sheets-Sheet 1

INVENTOR:
LESTER E. SMITH

BY
H. Samuel Kuser
ATTORNEY

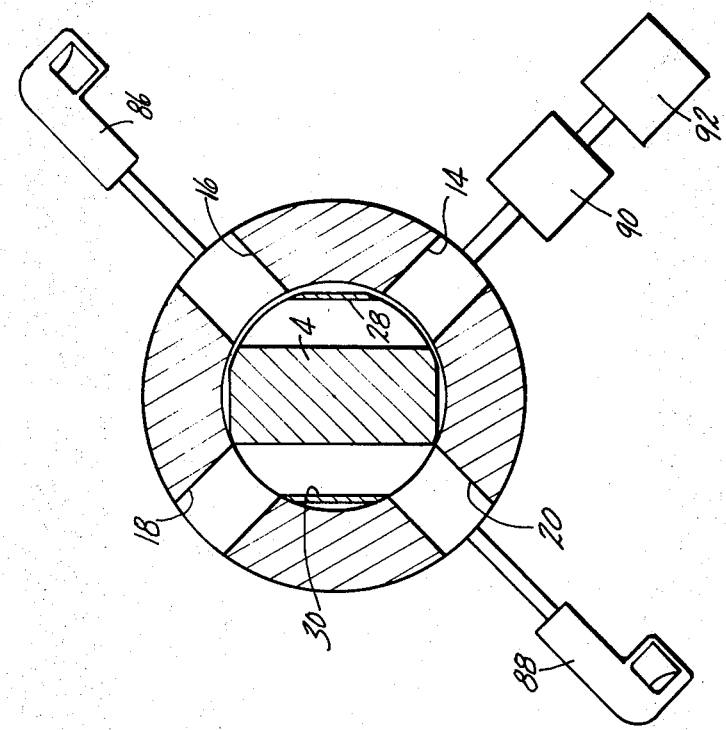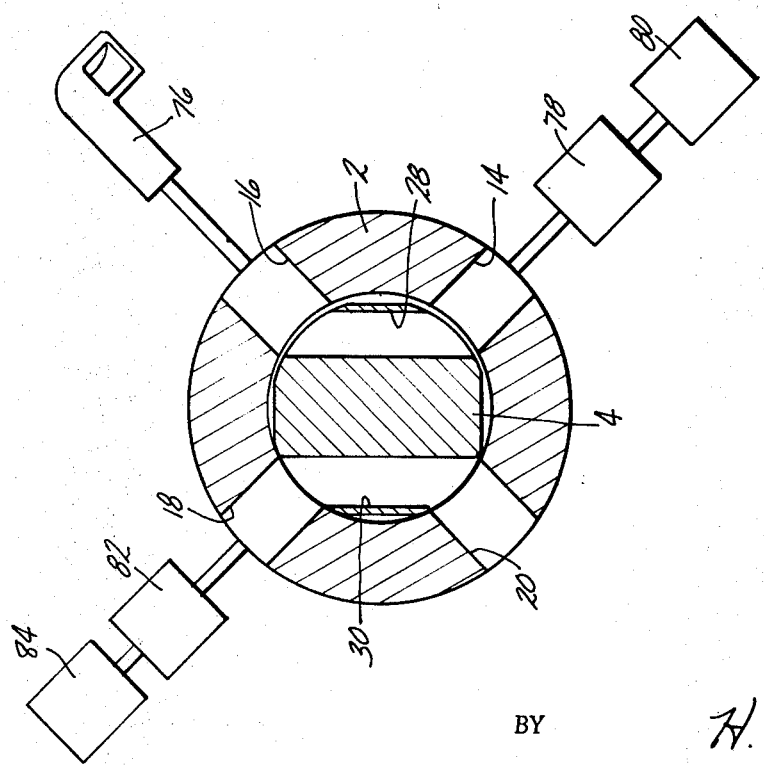

United States Patent Office 3,535,874
Patented Oct. 27, 1970

3,535,874
STARTING SYSTEM WITH SELECTOR VALVE
Lester E. Smith, Herrin, Ill., assignor to Olin Corporation, a corporation of Virginia
Filed Dec. 5, 1968, Ser. No. 781,494
Int. Cl. F02c 7/26
U.S. Cl. 60—39.14         4 Claims

ABSTRACT OF THE DISCLOSURE

A valve including a body having four ports having coplanar axes. A floatable rotor, having a flow channel therethrough, is mounted in said body and is rotatable to a position where each opening of the flow channel is in communication with an adjacent port.

---

This invention relates generally to valves, and more particularly to valves of the rotary type.

Some engine starting systems include two adjacent engines each provided with its own starting motor. In the case of such systems which utilize starting motors of the type that is driven by a high temperature gas generated by a "low energy" propellant cartridge, it is desirable that a switching valve be provided so that only one breech mechanism for actuating the cartridge need be provided. The switching valve with suitable system conduit means can be provided to connect the breech mechanism with either one of the two starting motors, thereby eliminating the need for two breech mechanisms. In other systems, it may be desirable to provide two breech mechanisms for a single starting motor. In such a system, some switching means must be provided so that the hot gas generated by a propellant cartridge in one of the breech mechanisms is directed only to the starting motor and the unused breech is sealed from the hot gas.

The present invention is directed to a switching valve which will work satisfactorily in systems such as have been described.

This invention has for one of its objects the provision of an improved switching valve for use with high temperature, corrosive media.

Another object of this invention is to provide a valve having an improved rotor designed to improve the sealing of a closed inlet or outlet or both.

A further object of this invention is to provide a switching valve which is designed to compensate for the relative differences in thermal expansion between the rotor and the valve body.

Yet another object of this invention is to provide a valve having a positive vent to the atmosphere on the sealing side thereof.

Still another object of this invention is to provide a relatively inexpensive, but reliable valve for use with high temperature media.

These and other objects and advantages of the invention will become more apparent by reference to the following description of a preferred embodiment and to the accompanying drawings in which:

FIG. 4 is a schematic diagram showing the valve of FIG. 1 used in a system having one breech and two starting motors; and FIG. 5 is a schematic diagram showing the valve of FIG. 1 used in a system having two breech mechanisms and a single starting motor.

Figure 1:
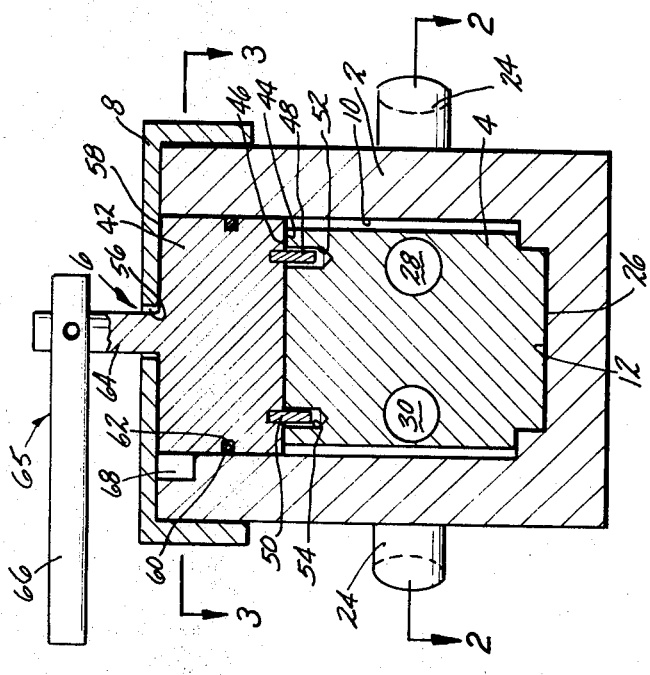
FIG. 1 is a vertical, cross-sectional view of a valve constructed in accordance with the present invention.

As shown in the drawings, a valve constructed in accordance with the present invention includes a valve body 2, a rotor 4 mounted within the valve body 2, an actuating mechanism 6 operably connected to the rotor 4 to impart rotation thereto, and a cap 8 closing the upper end of the valve body 2.

The valve body 2 is provided with a vertically extending, cylindrical bore 10 therein providing an open top and a closed bottom. The bottom 12 of the bore 10 is flat to provide a seat for the rotor 4. The valve body 2 is further provided with a series of ports 14, 16, 18 and 20 extending through the side wall 22 thereof. The ports, 14, 16, 18 and 20 are circumferentially spaced 45° apart with their axes all lying in a common plane and intersecting each other at the axis of the bore 10. Each of the ports 14, 16, 18 and 20 may have a conduit 24 in communication therewith to connect the valve to the system. Each of the conduits 24 may be attached to the valve body 2 by suitable means such as welding or the like.

The rotor 4 is mounted within the bore 10 of the valve body 2 with its flat bottom surface 26 resting on the bottom 12 of the bore 10. The rotor 4 is provided with two parallel, cylindrical flow channels 28 and 30, the axes of which are coplanar with the axes of the ports 14, 16, 18 and 20 in the valve body 2. The flow channels 28 and 30 are so constructed as to place two adjacent ports in the valve body 2 in communication with each other.

Figure 2:
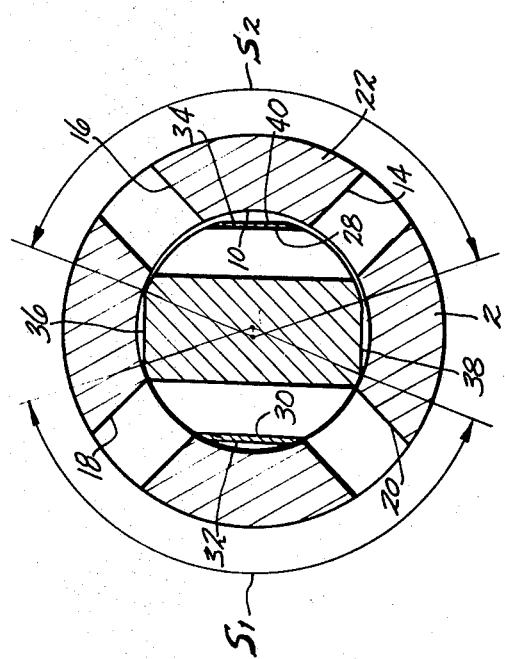
FIG. 2 is a horizontal, cross-sectional view taken along the lines 2—2 of FIG. 1.

Referring to FIG. 2, the outer wall of the rotor 4 defined by segment $S_1$ has a radius at each end thereof which forms an angle which is large enough to include the openings of flow channel 30 within the segment $S_1$. The segment $S_1$ is so positioned that a line bisecting the angle formed by the radii at the ends thereof is perpendicular to the axis of flow channel 30. Although the entire outer wall of the rotor 4 defined by segment $S_1$ can be an arc having a radius equal to the radius of the bore 10 with a small clearance allowance to make it practical, in the preferred embodiment, the middle portion 32 of the segment $S_1$ of the outer wall is planar. The planar middle portion is perpendicular to a line bisecting the angle formed by the radii at each end of the segment $S_1$. As will be noted, however, the planar middle portion 32 is so proportioned that the arc portion of segment $S_1$ of the outer wall is positioned on both sides of both openings of the flow channel 30.

The portion of the outer wall defined by segment $S_2$ is positioned opposite segment $S_1$ and is constructed similar to segment $S_1$ in that it includes a middle planar portion 34 and an arc portion that is positioned on both sides of both openings of flow channel 28. However, while the radius of the arc portion of the outer wall of both segments $S_1$ and $S_2$ is equal to the radius of the bore 10, the axis of the radius of curvature of the arc portion of segment $S_2$ is offset with respect to the axis of the radius of curvature of the arc portion of segment $S_1$ in a direction away from the segment $S_1$. In both cases the segment may be between about 130° to about 150°.

The outer wall of the rotor 4 between each of the segments $S_1$ and $S_2$ must extend outwardly from the central axis of the rotor 4 a distance less than the radius of the bore 10 so that the rotor 4 can float. For this purpose, the wall of the rotor between the segments $S_1$ and $S_2$ is planar as indicated at 36 and 38.

By virtue of the above-described arrangement, when the arc portion of the wall of the rotor 4 defined by segment $S_1$ is in engagement with the bore 10 a clearance space 40 of over 180° is provided between the remaining portion of the outer wall of the rotor 4 and the bore 10. If the arc portion of the wall of rotor 4 defined by segment $S_2$ would be in engagement with the bore 10, a clearance space of over 180° would also be formed between the remaining portion of the wall of the rotor 4 and the bore 10.

The actuating mechanism 6 includes a turning member 42 which is inserted into the bore 10 at the upper end thereof until its bottom face 44 rests on the top face 46 of the rotor 4. Two dowel members 48 and 50 extend from the bottom face 44 of the turning member 42 into oversize openings 52 and 54 in the top of the rotor 4 to provide means for imparting rotation of the turning member 42 to the rotor 4.

The cap 8 has a central aperture 56 and is threadedly secured to the top of the valve body 2. The inner surface of the cap 8 bears against a shoulder 58 on the turning member 42 to limit axial movement of the turning member 42. As the turning member 42 in turn rests on top of the rotor 4 and the bottom of rotor 4 in turn rests on the bottom 12 of bore 10, the rotor 4 will be limited in its movement in an axial direction. The fit between the rotor 4, the bottom 12 of bore 10, the turning member 42 and cap 8 should be relatively loose so that the floating action of the rotor 4 is not impeded and so that the turning of the rotor 4 can be achieved without the necessity of an undue amount of force.

An O-ring 60 is mounted in a circumferentially extending groove 62 in the outer surface of the rotor 4 and is in sealing engagement with the bore 10 of the valve body 2 to inhibit leakage of the fluid past the turning member 42. The O-ring 60 may be fabricated from any suitable elastomeric material capable of withstanding the high temperature of the fluid. For brief periods of use such as cartridge starting, normal commercial elastomeric materials may be used because the heat transfer to the O-ring is low enough that the O-ring will retain its elastomeric properties.

A projection 64 extends from the turning member 42 through the aperture 56 in the cap 8. Suitable actuating means may be attached to the projection 64. As shown in FIG. 1, such actuating means may be in the form of a handle 66. However, it is to be understood that the valve can be actuated by means of a commercially available rotary actuator, a commercially available piston and cylinder type actuator provided with suitable linkage, or a rack and pinion arrangement.

Figure 3:
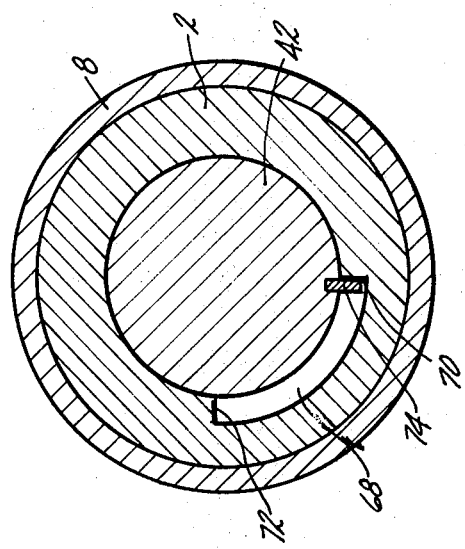
FIG. 3 is a horizontal view taken along the lines 3—3 of FIG. 1.

As shown in FIGS. 1 and 3, the upper portion of bore 10 is enlarged to form a groove 68 which extends a portion of the way about the circumference of the bore 10 and terminates in stop shoulders 70 and 72. A stop member 74 in the form of a dowel or the like extends radially outwardly from the side of the turning member 42. The stop shoulders 70 and 72 are so positioned with respect to stop member 74 such that when stop member 74 is in abutment with the shoulder 70, flow channel 28 provides communication between ports 14 and 16 and flow channel 30 provides communication between ports 18 and 20. If the rotor 4 were turned 90° until the stop member 74 is in engagement with stop shoulder 72, flow channel 28 would provide communication between ports 14 and 20 and flow channel 30 would provide communication between ports 16 and 18.

As shown in FIG. 2, since the axes of the outer surface of the rotor 4 defined by segments $S_1$ and $S_2$ are offset with respect to each other, and since the outer surface of the rotor 4 between the two segments $S_1$ and $S_2$ is planar, the rotor 4 can float in a direction perpendicular to the axis of the bore 10. Accordingly, if either port 14 or 16 were the inlet for the hot fluid and the components of the valve were positioned as shown in FIG. 2, the fluid would pass through the flow channel 28 and exit through port 14. The force of the fluid against the internal surface of the flow channel 28 would tend to force the arc portion of the wall of the rotor 4 defined by segment $S_1$ into tight sealing engagement with the wall of the bore 10 thereby sealing ports 18 and 20. In the preferred system with which this valve is to be used, one of the ports 18 and 20 would open into the atmosphere. Accordingly, even if there were leakage of the fluid around the rotor into the area defined by segment $S_1$, the fluid would exit through the outlet rather than through the other port which would be connected to a system component.

FIGS. 4 and 5 provide examples of the use of the valve with various systems. In FIG. 4, port 16 is connected to a breech mechanism 76 which is of the type designed to ignite a "low energy," solid propellant. Port 14 is connected to a starting motor 78 which in turn is operably connected in a manner well known in the art to an engine 80. The port 18 is connected to a second starting motor 82 which in turn is operably connected to a second engine 84. In this particular case, port 20 is open to the atmosphere. If it is desired to start engine 80, the rotor 4 is so positioned that flow channel 28 connects ports 14 and 16 and flow channel 30 provides communication between ports 18 and 20. When the breech mechanism 76 is actuated, the hot gas generated by the propellant flows through port 16, flow channel 28 and exits through port 14 where it passes to the starting motor 78 to provide a driving force for such motor. The force of the hot gas passing through flow channel 28 causes the rotor 4 to move to the left as viewed in FIG. 4 so that the arc portion of the segment of the outer wall of the rotor 4 opposite flow channel 28 will be in sealing engagement with the bore 10 in the valve body 2. In the event that there would be any leakage about the rotor 4 into the vicinity of outlet port 18, any leakage gas would tend to pass through flow channel 30 and be vented to the atmosphere through port 20. Likewise, any leakage of gas around the rotor 4 toward port 20 would immediately pass through port 20 into the atmosphere rather than entering the system through port 18. To start engine 84, the rotor is rotated until flow channel 28 is in communication with ports 16 and 18 and flow channel 30 is in communication with ports 14 and 20.

FIG. 5 shows another system embodiment in which a first breech mechanism 86 is connected to port 16 and a second breech mechanism 88 is connected to port 20. The starting motor indicated by 90 for starting engine 92 is connected to port 14. With the components of the valve arranged as shown in FIG. 5, flow channel 28 connects ports 14 and 16 and flow channel 30 connects ports 18 and 20. When the breech 86 is actuated, the gas generated by the propellant cartridge therein passes through port 16 and is conducted to the starting motor 90. The rotor 4 of the valve will react in a similar manner as that described in FIG. 4 with the exception that any leakage gas will tend to escape into the atmosphere through port 18. If it is desired to connect breech mechanism 88 to the starting motor 90, the rotor 4 of the valve is rotated such that flow channel 28 provides communication between ports 14 and 20 and flow channel 30 provides communication between ports 16 and 18. With this arrangement, when the hot gas enters flow channel 28, the rotor 4 will move toward ports 16 and 18 and into sealing engagement with the bore 10 of the valve body 2. As in the prior case, any leakage toward the low pressure side of the valve will tend to exit to the atmosphere through port 18. In both cases, in the event of leakage, there will not be any escape of hot gas into the unused breech which may contain an unfired cartridge.

By virtue of the above-described construction, a valve is provided that provides a high degree of flexibility for an engine starting system utilizing a high temperature gas. Not only does the valve have improved sealing qualities, it also provides for a definite leakage path to the atmosphere to prohibit any harmful effects from the high temperature gas. In addition, as the rotor 4 of the valve is mounted so its floats, a clearance space is provided on the high pressure side of the valve between the outside surface of the rotor 4 and the bore 10. This provides space for relative thermal expansion between the rotor 4 and the valve body 2 caused by the high temperature gas.

What is claimed is:

1. An engine starting system comprising a starting motor, two breech mechanisms for actuating a propellant cartridge, a switching valve for selectively connecting either one of said breech mechanisms with said starting motor, said valve including a housing having four ports the axes of which are all coplanar, first conduit means connecting the first of said ports to the first of said breech mechanisms, second conduit means connecting the second of said ports to said starting motor, third conduit means connecting the third of said ports to the second breech mechanism, and the fourth of said ports being vented to the atmosphere, said second port being adjacent to said first and third ports, a rotor mounted in a cylindrical bore in said body and having at least one flow channel extending therethrough, the axis of said flow channel being coplanar with the axes of said ports, at least a portion of a first segment of the outer side wall of said rotor being an arc having a radius of curvature equal to the radius of curvature of said bore, at least a portion of a second segment of the outer side wall of said rotor being an arc having a radius of curvature equal to the radius of said bore and having an axis offset with respect to the axis of the radius of curvature of said first segment in a direction away from said second segment, the arc portion of one of said segments being positioned on both sides of both openings of said flow channel, the remaining portion of said outer side wall of said rotor being spaced from the axis of said rotor a distance less than the radius of said bore whereby said rotor can float in a direction parallel to the plane of the axes of said ports and means mounting said rotor for rotation between a first position wherein said flow channel provides communication between said first and second ports and a second position wherein said flow channel provides communication between said second and third ports.

2. The engine starting system of claim 1 wherein said rotor includes a second flow channel having an axis parallel to the first flow channel and coplanar with the axes of said ports, said second flow channel providing communication between said second and third ports when said rotor is in said first position and providing communication with said first and fourth ports when said rotor is in said second position.

3. An engine starting system comprising a breech mechanism for actuating a propellant cartridge, two starting motors, a switching valve for selectively connecting either one of said breech mechanisms with said starting motor, said valve including a housing having four ports the axes of which are all coplanar, first conduit means connecting the first of said ports to the first of said starting motors, a second conduit means connecting the second of said ports to said breech mechanism, third conduit means connecting the third of said ports to the second of said starting motors, and the fourth port being vented to the atmosphere, said second port being adjacent to said first and third ports, a rotor mounted in a cylindrical bore in said body and having at least one flow channel extending therethrough, the axis of said flow channel being coplanar with the axes of said ports, at least a portion of a first segment of the outer side wall of said rotor being an arc having a radius of curvature equal to the radius of curvature of said bore, at least a portion of a second segment of the outer side wall of said rotor being an arc having a radius of curvature equal to the radius of said bore and having an axis offset with respect to the axis of the radius of curvature of said first segment in a direction away from said second segment, the arc portion of one of said segments being positioned on both sides of both openings of said flow channel, the remaining portion of said outer side wall of said rotor being spaced from the axis of said rotor a distance less than the radius of said bore whereby said rotor can float in a direction parallel to the plane of the axes of said ports and means mounting said rotor for rotation between a first position wherein said flow channel provides communication between said first and second ports and a second position wherein said flow channel provides communication between said second and third ports.

4. The engine starting system of claim 3 wherein said rotor includes a second flow channel having an axis parallel to the first flow channel and coplanar with the axes of said ports, said second flow channel providing communication between said second and third ports when said rotor is in said first position and providing communication with said first and fourth ports when said rotor is in said second position.

References Cited
UNITED STATES PATENTS

| | | | |
|---|---|---|---|
| 2,806,351 | 9/1957 | Kent et al. | 60—39.14 |
| 2,840,987 | 7/1958 | Bloomberg et al. | 60—39.14 |
| 3,098,626 | 7/1963 | Messinger | 60—39.14 XR |
| 3,117,418 | 1/1964 | McCoy et al. | 60—39.14 |

CARLTON R. CROYLE, Primary Examiner

U.S. Cl. X.R.

137—625.47